United States Patent [19]

Brown et al.

[11] Patent Number: 4,892,484

[45] Date of Patent: Jan. 9, 1990

[54] INTERCONNECTING TOY

[76] Inventors: Dorothy M. Brown; John S. Brown, both of 2570 Wells Rd., Ashland, Ohio 44805

[21] Appl. No.: 319,303

[22] Filed: Mar. 6, 1989

[51] Int. Cl.⁴ .......................... G09B 1/36; A63H 33/08
[52] U.S. Cl. ...................................... 434/259; 434/159; 434/170; 434/207; 434/403; 446/125; 446/126
[58] Field of Search ................. 446/85, 124, 125, 126, 446/128; 434/159, 170, 171, 207, 211, 403, 259

[56] References Cited

U.S. PATENT DOCUMENTS 2,861,388 11/1958 Favaretto ........................ 446/124 X

FOREIGN PATENT DOCUMENTS 247160 1/1961 Australia ............................. 446/126
77699 2/1962 France ................................ 446/128
507400 12/1954 Italy .................................... 446/126

Primary Examiner—William H. Grieb
Attorney, Agent, or Firm—Renner, Kenner, Greive, Bobak, Taylor & Weber

[57] ABSTRACT

An improved interconnecting toy which, through its various uses, provides various educational experiences to the user and which comprises a game piece (1) with joined tubular members comprised of connective ends; and which comprises a game piece (2) with joined tubular member comprised of connective ends. The connective ends may be of the male or female type (7 and 6 respectively). The tubular members may be circumferentially configured in any geometric shape, and may consist of any variety of colors; and the tubular members may be imprinted or decalled with numeric, alphabetic, or logo-type designations, all of which enhance the educational experience that results from use of the invention.

8 Claims, 1 Drawing Sheet

INTERCONNECTING TOY

TECHNICAL FIELD

The present invention resides in the art of for children and young adults, and more particularly, to toys which have interconnecting parts.

BACKGROUND ART

With respect to the toy industry, a variety of interconnecting toys are known. Historically known as construction toys, these types of toys appeared as early as the 1860's when Ellis, Britton, and Eaton of Springfield, Vermont manufactured hardwood logs with simple locking devices. Charles Crandall of Brooklyn, N.Y. developed a system of tongue and grooved building blocks in the mid 1800's. In 19th century England, Burlington Building Blocks were developed which consisted of hardwood slats with small holes drilled through to be fastened together by pegs. In 1913, A. C. Gilbert, a United States manufacturer, created Erector, "The Master Builder Set." These sets were advertised as the only construction toy with girders like real structural steel. Also in 1913, Chad Valley of Birmingham, England offered a construction set which consisted of a large assortment of printed card sections of various shapes and sizes, with clips for fixing them together.

In 1918, Lott's of Waterford, England offered thin rectangular blocks believed to have been first made from ground-down Italian marble. Some sets consisted of embossed bricks, arch pieces, mullioned window pieces, cathedral construction pieces, and Tudor and cottage style pieces. In the 1920's, Gibruder Bind of Nuremburg, Germany produced the Bing Structator—advertised as the "up-to-date" construction toy. Its parts consisted of aluminum sections. Adolph Schuhmann of Nuremburg, Germany produced metal building bricks during the early 20th century under the name COMBINATOR. Similar to the basic concept employed by A. C. Gilbert was the Meccano construction set produced at Binns Road, Liverpool, England. This set also employed metal strips, but which were drilled with holes equal in circumference at half-inch intervals.

More modern toys which are still in use today were created by Gottfried Christianson of Denmark around the 1920's under the name Lego. These toy building blocks were formed from plastic. Additionllly, Tinkertoy sets were first sold in 1914, and consisted of various wooden parts, thin in circumference, which were designed to be inserted into and interconnected with barrel-shaped wooden pieces to form various shapes.

Mr. Magnet is also a toy of relatively recent manufacture and consists of various-sized magnetized metal pieces, which were designed to be built upon a magnetic pad. The pieces were kept in place by the strength of the magnetic field between the pad and the pieces. The toy is believed to have been manufactured by Ohio Art.

In the last several years, Ohio Art has created yet another interconnecting toy, Zaks, which is composed of a soft, pliable plastic compound. The toy resembles a waffle in appearance, and is designed to have the edges of its various parts connected together. The toy has the further feature of being moveable at hinged junctions.

As can be readily seen from this brief history, the general educational experiences provided by these interconnecting toys are somewhat limited.

DISCLOSURE OF THE INVENTION

In view of the foregoing, it is a first aspect of the invention to provide the user with a vehicle through which various educational experiences result through play activities.

Another aspect of the invention is to provide a vehicle through which play activities improve the user's physical skills—namely, manual dexterity and eye-hand coordination.

A further aspect of the invention is to provide a vehicle through which play activities develop the user's social and interpersonal skills primarily in the areas of communication and cooperation with other joint users, as well as fostering desirable reinforcement from supervisory users.

Yet an additional aspect of the invention is to provide a vehicle through which play activities will foster the user's psychological development—namely, the encouragement of expression of emotional feelings.

Still a further aspect of the invention is to provide a vehicle through which play activities will foster creativity, curiosity and concentration in the user.

Another aspect of the invention is to provide a vehicle through which play activities will develop the user's interaction with the environment—namely, recognition of colors, shapes, sizes, spatial formations, and gravity.

Yet an additional aspect of the invention is to provide a vehicle, and specifically an interconnecting vehicle, through which interconnection educates the user as to colors, geometric shapes, alphabetic and numeric systems, and various other objects.

Further objects and advantages of the invention will become apparent from the consideration of the drawings and ensuing detailed description.

The foregoing and other objects of the invention which will become apparent as the detailed description proceeds are achieved by an educational toy, comprising: a first game piece, having a plurality of first tubular members extending therefrom, said first game piece establishing a base; and a plurality of second game pieces, each having a plurality of second tubular members extending therefrom, said first and second tubular members being adapted for mating interconnection with each other.

DESCRIPTION OF THE DRAWING

For a complete understanding of the objects, techniques and structure of the invention, reference should be had to the following detailed description and accompanying drawing wherein.

BEST MODE FOR CARRYING OUT THE INVENTION

Figure 1:
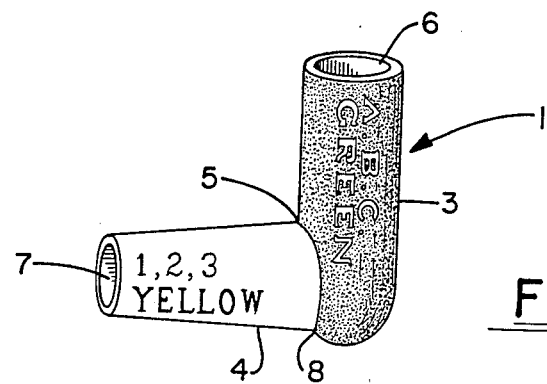
FIG. 1 is perspective side elevational view of a game part piece according to the invention.
Figure 2:
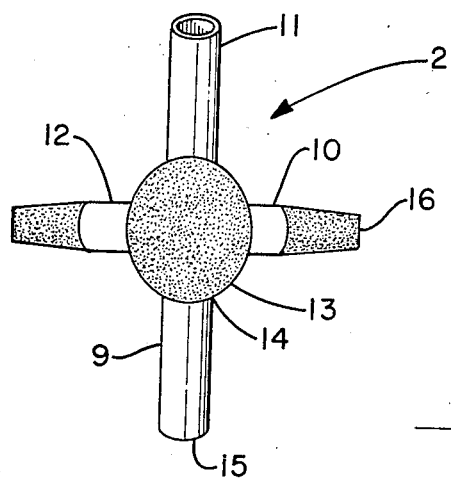
FIG. 2 is a top elevational view of a game part piece according to the invention.

FIGS. 1 and 2 show game pieces, according to the preferred embodiment of the invention. Game piece 1 may comprise tubular member 3 and tubular member 4, which may be joined to each other at a right angle 5 closing respective ends thereof. However, it should be appreciated that the tubular members 3 and 4 may be joined at any other suitable angle, including that which would result in a perfectly linear configuration. Likewise, it should be appreciated that any number of tubular members may be joined at various angles to form a game piece.

Game piece 2 may comprise tubular members 9, 10, 11 and 12, as well as a central stabilizing piece 13. The tubular members 9, 10, 11 and 12 may be joined to the central stabilizing piece 13 in such a way as to form four 90 degree angles, as best exemplified at 14. It should be appreciated, however, that more than four tubular members may be joined to stabilizing piece 13, but it is preferred that at least three tubular members must be employed. Additionally, dependent upon the number of tubular members present, the connective angles formed as a result of the tubular members being united with stabilizing piece 13 may be greater than or less than 90 degrees. It will also be understood that the tubular members may extend from the central stabilizing piece 13 either symmetrically or asymmetrically Game pieces 1 and 2 are manufactured from any suitable plastic compound, and according to any manufacturing process suitable for such compound Typically, extrusion as well as casting methods may be employed to effect the desired shapes although other methods may be employed as well The joinder at right angles 5 and 14 may be accomplished through any suitable means, and may typically include an adhesive or other bonding method Of course, it is contemplated that for certain configurations of the game piece 1, the piece may be molded as a single unit, or may be molded in symmetrical halves for later joinder of the whole.

The tubular member 3, in relation to tubular member 4, may consist of a shape somewhat larger in circumference than that of tubular member 4 so that end 6 is able to receive a comparable geometrically-shaped end 7 from other game pieces. The circumference of tubular member 3 may be constant. Conversely, the tubular member 4, in relation to tubular member 3, may consist of a shape with a varied and somewhat smaller circumference to that of tubular member 3, so that end 7 is able to be received within a comparable geometrically-shaped end 6. The smaller end circumference of tubular member 4 may be achieved in a variety of ways, however, it will typically be achieved by tapering the tubular member 4 from its maximum circumference at its joint base 8, to the desired circumference at end 7. This taper facilitates mating engagement between the female tubular member 3 and the male tubular member 4. Engagement between the two is achieved b frictional engagement at that point of penetration where the outside diameter of the member 4 equals the preferably constant inside diameter of the member 6. It should be appreciated, however, that any given game piece may have tubular members 3 and 4 which are the same circumference, as long as other game pieces have tubular members 3 and 4 having respective circumferences sufficient to effect the interconnection described above.

The tubular members 9, 10, 11 and 12 may consist of two basic tubular member forms, best exemplified by tubular members 3 and 4 described in the paragraph immediately preceding. It should be appreciated that game piece 2 may consist entirely of tubular members best exemplified by the shape of tubular member 3, or tubular member 4, or any combination thereof. As with ends 6 and 7, ends 15 and 16 are respectively designed to receive or be received within comparable geometrically-shaped game pieces.

It should be appreciated that game pieces 1 and 2 are designed to be used interconnectively with one another; however, they may be used interconnectively with themselves.

The preferred lengths of tubular members 3 and 4 are at least 2 inches and 1¾ inches, respectively, although other lengths may also be employed These preferred lengths render game piece 1 child safe. The preferred outside diameter of tubular member 3 is ⅞ inch, with an inside diameter or crosswise measurement of ¾ inch, providing for a wall thickness of 1/16 inch. The end of tubular member 3 has a preferred outside diameter of ⅝ inch, expanding in tapered fashion to ⅞ inch at the joint 8. The tubular member 3 also has a preferred wall thickness of 1/16 inch. With the taper just described, the outer wall of tubular member 4 will securely engage the inner wall of tubular member 3 at about the midpoint of the member 4. Of course, other measurements may also be employed.

The stabilizing piece 13 provides a base or starting piece for a structure configured by interconnection with the pieces 1 and/or 2, and may be configured in any suitable geometric shape. Its preferred crosswise measurement may be 2 inches, although other measurements may be employed. Its preferred width should be at least larger than the diameter or other crosswise measurement of stabilizing piece connective end 14. The preferred overall length of game piece 2 is 8 inches, however, other measurements may be employed as well. The preferred overall length of game piece 2 renders it child safe. The tubular extensions 9,11 are preferably of the same cross sectional configuration and dimensions as the tubular piece 3. Similarly, the tubular extensions 10,12 are preferably of the same taper and cross sectional configuration and dimensions as the tubular piece 4.

The tubular members 3, 4, 9 and 10 may be configured in cross section to have the shape of a circle, triangle, square, hexagon or any other multi-sided geometric shape in order to effect the method under which said shapes are connected to comparable game pieces. Typically, only tubular members which are of the same shape may be connected; however, it should be appreciated that the tubular members in any given game piece may be of different geometric shapes.

As shown, the tubular members 3, 4, 9 and 10 may consist of the same or different colorations in order to effect the method under which said members are connected to comparable game pieces. Typically, only tubular members which are of the same color may be connected; however, it should be appreciated that other combinations are possible as well.

As shown, the tubular members 3, 4, 9 and 10 may be imprinted or decalled with either numeric, alphabetic, or logo-type designations in order to further effect the method under which said shapes are connected to comparable game pieces. Typically, only the tubular members of the pieces which are imprinted with the same numeric, alphabetic, or logo-type designations may be connected; however, it should be appreciated that other combinations are possible as well.

Thus, it should be apparent that the invention provides an educational toy designed to enhance the development of many skill areas of a child. The size, extent, and configuration of any structure configured by joining mating tubular members of the game pieces 1 and 2 is virtually unlimited. By alphabetic, numeric, color coding or logo coding the various tubular members to indicate possible joinder, the child using the structure of the invention is assisted in learning geometric, alphanumeric, color, and other designations, and is rewarded by the mating of corresponding tubular members and the growth of the resultant structure. While it is possible to obtain a totally closed structure with no unmated tubular members, the nature of the game pieces is such that substantial expansion of the size of the structure will often have occurred before such closure is experienced.

While the above description contains many specificities, these should not be construed as limitations on the scope of the invention, but rather as an exemplification of one preferred embodiment thereof. Many other variations are possible. For example, solid cylindrical shapes may be employed with appropriate male and female ends. Accordingly, the scope of the invention should be determined not by the embodiment illustrated, but by the appended claims and their legal equivalents.

What is claimed:

1. An educational toy, comprising:
   a first game piece, having a plurality of first tubular members extending therefrom, said first game piece establishing a base;
   a plurality of second game pieces, each having a plurality of second tubular members extending therefrom, said first and second tubular members being adapted for mating interconnection with each other; and
   wherein certain of said tubular members are of a uniform cross section along a length thereof, and others of said tubular members are tapered, having a gradually changing cross section along a length thereof, said tapered tubular members extending from a smaller unattached end to a larger end attached to the respective game piece, and being of various cross sectional geometric configurations, tubular members of one game piece being adapted for mating interconnection with tubular members of like cross sectional configurations of another game piece, said tubular members including indicia thereon for indicating the mateability of each tubular member with other tubular members.

2. The educational toy according to claim 1, wherein said indicia comprises a color code.

3. The educational toy according to claim 1, wherein said indicia comprises an alphabetic code.

4. The educational toy according to claim 1, wherein said indicia comprises a numeric code.

5. The educational toy according to claim 1, wherein said indicia comprises a logo-type code.

6. The educational toy according to claim 1, wherein said tubular members are substantially orthogonal to each other.

7. The educational toy according to claim 6, wherein said first game piece comprises a central stabilizing piece, from which extends said tubular members.

8. The educational toy according to claim 7, further comprising a plurality of said first game pieces.

* * * * *